Figure 1:
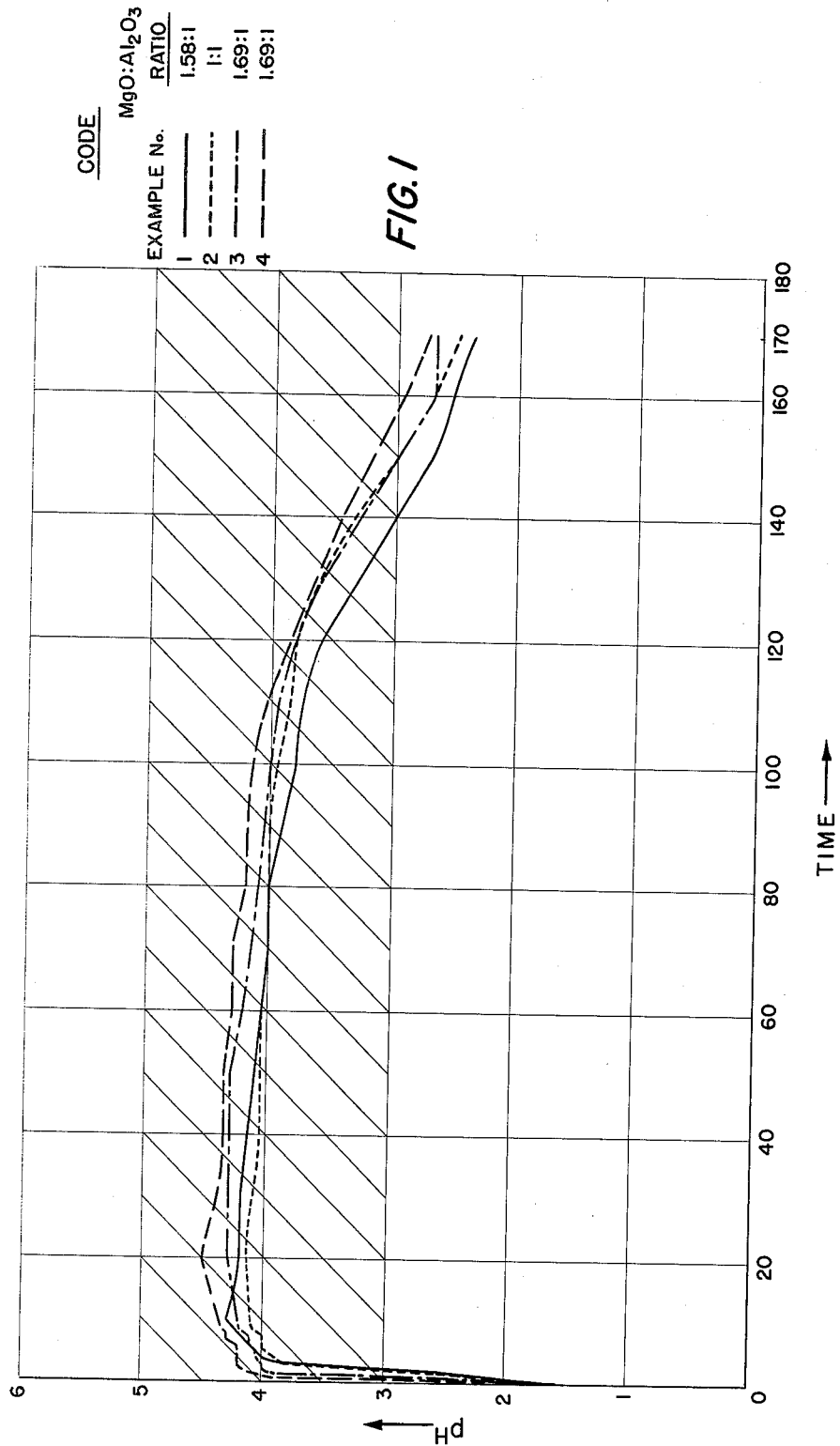

FIG. 6

| CODE | | |
|---|---|---|
| | | MgO:Al$_2$O$_3$ RATIO |
| TABLE VI EXAM. No.14 | — — — | 1.5I:1 |
| VII | — — — | " " |
| VIII | — · — · — | " " |

3,245,876
ANTACID COMPOSITIONS CONTAINING HIGH CONCENTRATIONS OF MAGNESIUM HYDROXIDE AND PROCESS OF MAKING THE SAME
James J. Martin, Jr., Sayre Woods South, N.J., assignor, by mesne assignments, to Armour Pharmaceutical Company, Chicago, Ill., a corporation of Delaware
Filed May 17, 1963, Ser. No. 281,159
13 Claims. (Cl. 167—55)

This invention relates to antacid compositions, and more particularly to antacid compositions comprising mixed aluminum and magnesium hydroxides which optionally are codried, and to a process for preparing the same. The antacids prepared in accordance with this invention have a surprisingly rapid, constant, unvarying, and sustained buffering capacity against acids, such as hydrochloric acid, being capable of stabilizing pH within the range from 3 to 5 for at least one hour. The antacids of this invention are of great value in combatting stomach hyperacidity.

Antacid preparations are now quite generally employed for the treatment of peptic ulcers, gastric hyperacidity and dyspepsia. Gwilt, Livingstone and Robertson in the Journal of Pharmacy and Pharmacology, X, No. 12, 770–775 (1958), describe the characteristics of an ideal antacid. They point out that it should show its maximum neutralizing effect in the shortest possible time, that it should neutralize an adequate amount of gastric hydrochloric acid and maintain its action during the normal period of gastric digestion, that any excess however great beyond the amount required to neutralize free gastric acid should not cause alkalization, that it should raise the pH of the gastric contents to a level at which pepsin activity is reduced significantly but not totally inhibited, that adequate and repeated doses should be palatable to the hyperacid patient, and that its use should not lead to laxative, constipating or other side effects such as gastric irritation. In addition to these factors, the antacid composition should be inexpensive and it should not deteriorate significantly in any respect on aging. These workers summarize the various statements in the literature as to the pH ranges desirable for the ideal antacid, and conclude that a pH within the range from about 3 to about 5 is apparently the optimum to ensure adequate relief from hyperacidity, particularly if an ulcer site is present, and at the same time permits sufficient residual pepsin activity to avoid secondary digestive disturbances.

Modern therapeutic practice has thus abandoned the administration of excessive quantities of strong antacids, such as sodium bicarbonate, in favor of acid buffers, such as aluminum hydroxide, in order to control the gastric acidity at physiologically more desirable levels, thus minimizing the further secretion of stomach acids and avoiding the risk of alkalosis. It is thus one of the purposes of this invention to avoid an excessive initial increase in the pH of the gastric juices while providing an antacid of constant and sustained activity.

Edwards in The Chemist and Druggist, December 14, 1957, page 647, also discusses the properties of an ideal antacid, and suggests that the nearest approach to the ideal attained as of that date was wet activated alumina gel. Dr. Edwards' views on the properties of the ideal antacid are in substantial agreement with those expressed by Gwilt et al.

Liquid aluminum hydroxide gel closely approaches the ideal for an antacid, but its liquid form makes it inconvenient to use, especially in the case of ambulatory patients. The liquid gel is quite rapid in its action and gives a prolonged antacid effect in the optimum pH range. It is not significantly affected in its antacid properties by pepsin, and it also does not significantly lose its antacid characteristics on aging. However, as Edwards and others have pointed out, it may have a mildly constipating effect, which many have sought to remedy by combining it with other ingredients such as magnesium hydroxide or carbonate.

The advantages of the dried gel are obvious. However, the obvious material, dried aluminum hydroxide gel, is actually far from an ideal antacid. It exhibits an undesirable lag in its rate of reaction with stomach acids. It does not give a prolonged antacid effect in the optimum pH range, and its antacid properties are severely affected by pepsin. Also, its antacid activity is less than that of the liquid gel, being decreased by the drying and the reduced activity decreases further with aging. These disadvantages have been noted by Gwilt et al., and other workers in this field.

In order to surmount the disadvantages inherent in the use of aluminum hydroxide as an antacid, various mixtures thereof with other bases and basic salts have been tried by those skilled in the art, so as to achieve a sustained buffering action within the desired pH range. Among such mixtures has been that described by Loewig German Patent No. 70,175, who adds slowly a solution of an alkali metal aluminate to a solution containing an excess of magnesium bicarbonate, obtaining aluminum hydroxide gel and magnesium carbonate in a composition he gives as $Al_2H_6O_6MgCO_3$, which is washed, dried and powdered. The product contains approximately equal molar proportions of aluminum and magnesium, calculated as the oxides. However, this product is rather slow reacting, not different in this respect from dried aluminum hydroxide gel.

Beekman U.S. Patent No. 2,797,978 showed that the product obtained by precipitating magnesium carbonate in the presence of aluminum hydroxy carbonate gel was superior to Loewig's in reaction velocity and in acid-consuming capacity. Beekman's product was identified as aluminum magnesium hydroxy carbonate, and is obtained by precipitation at a pH of about 8. It contains a relatively small amount of magnesium, from 5 to 25% Mg calculated as MgO for 100 parts of the total magnesium and aluminum oxides.

The Beekman aluminum magnesium hydroxy carbonate has in fact established a high standard of antacid effectiveness, not equaled by other proposed combinations. The composition is far superior to dry blends of aluminum hydroxide and magnesium carbonate, which cannot maintain pH within the optimum range of 3 to 5 for more than about one half hour.

Schenk, Schweizerische Medizinische Wochenschrift No. 51, pp. 1418–20 (1954) proposed a 3:1 mixture of $Al(OH)_3$ and $Mg(OH)_2$, which he showed was better than aluminum hydroxide gel alone. However, initially there is a high pH rise above 5, to 6 or 7, which is undesirable. The Beekman composition on the other hand, holds the pH at above 3 and never exceeding 4.5 for well over 2 hours.

Both U.S. Patent No. 2,880,136 and British Patent No. 745,493 coprecipitate aluminum hydroxide and one or both of magnesium and calcium carbonates at a pH of about 8.5. However, this coprecipitate also gives a rapid initial pH rise to more than 6, and the pH remains above the maximum of 5 for over an hour.

Schenk U.S. Patent No. 2,958,626 describes a process for making an antacid which involves reacting sodium aluminate with magnesium bicarbonate and carbon dioxide. The product of this reaction is the aluminum magnesium hydroxy carbonate of the Beekman patent. Analysis of the product obtained by the Schenk examples confirms that the product is amorphous, has no X-ray diffraction spectra, corresponds to a mixture of the above chemicals by infrared analysis, and has the same approximate $Al_2O_3$, $MgO$, $Na_2O$ and $CO_2$ content, pH and acid-consuming capacity of the Beekman product. It acts as though it were the same antacid in the Holbert, Noble and Grote test.

Because it has a low magnesium oxide content, the Beekman aluminum magnesium hydroxy carbonate has a low or no cathartic activity. This is not advantageous, if cathartic activity is desired to overcome the constipating effect of the aluminum hydroxide gel. However, it has not heretofore been possible to prepare an antacid with a high magnesium oxide content that will not also give a rapid and too high initial pH, above the permissible 5, because of the high alkalinity of magnesium oxide.

The high alkalinity of magnesium hydroxide which has restricted its use in antacid blends also makes the pure $Mg(OH)_2$ an unsuitable antacid by the modern standards discussed above. To illustrate: pure magnesium hydroxide in in vitro tests demonstrates a very rapid—almost instantaneous—pH rise to beyond the optimum range of 3–5, a one gram dose producing a pH peak of about 9 within one minute or less. The pH does not decrease to a level within the range of 3 to 5 until over two hours have elapsed. Magnesium hydroxide—magnesium carbonate systems are also undesirable as they too have a high pH; even a 1:3 blend has a pH of 10.4.

In accordance with the invention, an antacid composition is provided having an extraordinarily high content of magnesium, calculated as the oxide, and a rapid effectiveness, remaining above a pH of 3 but without exceeding a pH of 5 for at least one hour and as much as two hours or more.

The antacid of the invention can be described chemically as an aluminum-magnesium hydroxide. However, this is not meant to imply that it is a single chemical compound, since the composition and structure are as yet unknown. The aluminum, magnesium and hydroxyl groups may be associated in some form of complex ion or coordination complex or the product of this invention may be a simple mixture. But, even though free $Mg(OH)_2$ is present, the antacid characteristics of the product differ substantially from conventional blends of aluminum hydroxide and magnesium hydroxide having a high $Mg(OH)_2$ content. The antacids of the invention do not display the undesirably high initial pH rise heretofore experienced with blended materials of comparable $MgO:Al_2O_3$ ratios.

These antacids are capable, as determined by the Holbert, Noble and Grote test procedure, of maintaining a pH in the stomach within the range from 3 to 5, and preferably from 3.5 to 4.5, for two hours and longer, and rapidly increase the pH to within this range without exceeding the maximum optimal pH of 5.

The antacid effectiveness of the antacids of the invention is determined by the method of Holbert, Noble and Grote, Journal of the American Pharmaceutical Association (scientific edition), 36 149 (1947); 37 292 (1948); 41 361 (1952); as modified by Stewart M. Beekman, 49 191 (1960). In this method, a test sample of antacid is added to 150 ml. of artificial gastric juice consisting of 0.0316 N hydrochloric acid containing 2 g. of pepsin. The artificial gastric juice is maintained at a temperature of 37.5° C. The test procedure is carried out by continuously introducing fresh artificial gastric juice, beginning with the tenth minute of the test period, and removing the antacid-gastric juice mixture by overflow at the rate of 2 ml. per minute. The antacid effect is determined by measuring the pH of the artificial gastric juice during the test period, which is two hours or longer. This is the test procedure used in the examples.

The antacids of this invention are intended to be marketed as wet slurries, gels or dry solids. They can have a weight ratio of aluminum to magnesium calculated as the equivalent oxides (i.e., $MgO:Al_2O_3$) within the range of from about 0.5:1 to about 3:1 without causing an undesirable rapid pH increase to above 5, following administration. The lower limit to the proportion of magnesium to aluminum is not critical. However too low a ratio will result in an antacid not displaying a rapid pH rise to within the range of 3 to 5; this is undesirable. On the other hand, too high a magnesium hydroxide content will give an initial pH rise to beyond the maximum permissible level of 5. A preferred relatively high magnesium to aluminum ratio which results in a fast acting antacid with a cathartic effect counteracting possible constipating effects due to aluminum hydroxide is about 1:1 to 1.5:1.

The antacids of the invention are manufactured by preparation of a water slurry of a high density magnesium hydroxide and a freshly precipitated moist aluminum hydroxide gel of high antacid activity. The resultant slurry is agitated to provide intimate mixing and/or interaction of the components. The slurried reaction mixture can be used as such. If a less wet composition is desired, surplus water is removed to provide a gelled or codried mixture of aluminum and magnesium hydroxides.

A preferred high density magnesium hyroxide is that prepared from dolomite in accordance with Waldron et al. U.S. Patent No. 3,080,215 that is, dolomite is calcined to produce dolime, the dolime is slacked to produce a slaked dolime slurry, and the slaked dolime slurry is then intermixed with a magnesium chloride-containing brine for a period of at least about 2 hours at a temperature of about 40° and 80° C., the dolime slurry being sufficient to provide a slight excess of calcium hydroxide relative to magnesium chloride, and recovering the magnesium hydroxide thus produced. Such a material is marketed by the Dow Chemical Company under the tradename "60D Magnesium Hydroxide Slurry." In general, any magnesium hydroxide is prepared by the process described in Patent No. 3,080,215 can be used. Such magnesium hydroxides are characterized as dense magnesium hydroxides recoverable by ordinary filter equipment as a washed filter cake containing at least 45% $Mg(OH)_2$. The dense slurry form, the filter cake, the compressed gel, and the dried slurry or cake or gel, can be used in the invention herein. Such magnesium hydroxides are referred to in the claims generically as "high density magnesium hydroxide." Magnesium hydroxides not meeting the above requirements will result in products having too high an initial pH rise above the maximum permissible level of 5.

The freshly precipitated aluminum hydroxide gel must not have been dried prior to use, i.e., it must contain a sufficient amount of the original gel water to make it moist, usually at least 5%. There is no upper limit on water content. An aluminum hydroxide gel of high antacid activity must meet the specifications for aluminum hydroxide gel given by the United States Pharmacopoeia, i.e., the equivalent of 0.5 gram $Al_2O_3$ must neutralize a minimum of 250 ml. 1/10 N HCl. Examples of such gels are the aluminum hydroxide compressed gels, types F–500, F–1000, and F–2000 manufactured by the Reheis Company Incorporated. Such gels may have up to 90% water, which is taken into account in computing the total water content of the slurry, below.

The ratio of magnesium hydroxide to aluminum hydroxide in the slurry is not critical, and will depend upon the ratio of these components desired in the final product.

Likewise, the temperature at which the slurry is prepared is not critical. Room temperature may be conveniently employed, and higher temperatures can be used without adverse effect.

The water content of the slurry is also not critical, but obviously lower water contents favor more economic manufacture of the antacid. Water contents of from 65% to 90%, expressed as the weight percent of water based on total slurry, have been used to advantage. Higher ratios can as readily be used. Lower ratios can also be used as limited by the water contents of the starting materials and the necessity for providing proper mixing of the slurry.

The antacid product may contain small amounts of carbonate ion or carbon dioxide usually within the range from about 5% to about 12%. This represents material occluded in the gels in the process of manufacture or material absorbed by the gels in storage and is not significant to the process or products disclosed herein.

The resulting mixture prepared as above described may be concentrated to a gel or dried by any convenient method known to those skilled in the art, such as, for example, spray drying, tray drying, or vacuum drying. The ultimate dried composition is in the form of a codried gel containing less than 25% of water, which can be reduced to powdered form for convenience of packaging and marketing. The powder may be marketed as such or tabletted, using the customary excipients, for example, a polyol, a sweetener, and a lubricant such as mannitol, dextrose and magnesium stearate.

The following examples in the opinion of the inventor represent the best embodiments of the invention.

EXAMPLE 1

100 grams of a freshly precipitated moist aluminum hydroxide gel (type F 1000–10.6% $Al_2O_3$) was added to 62.8 grams of the Dow 60 D magnesium hydroxide slurry prepared in accordance with Series Two; Example 3 of U.S. Patent No. 3,080,215. The resulting suspension was mixed for one half hour with a Lightnin' agitator and the slurry was then dried at 45° C. for 8 hours. The dried lumps were pulverized in a Mikro Sample Mill using a 0.20 inch mesh herringbone screen to yield 47.6 grams of codried aluminum hydroxide magnesium hydroxide antacid gel in form of a white free-flowing powder. The product analyzed as follows:

MgO, percent _____ 35.0
$Al_2O_3$, percent _____ 22.2
MgO/$Al_2O_3$ ratio (weight basis) _____ 1.58/1.00

EXAMPLE 2

100 grams of Reheis F–1000 aluminum hydroxide gel (10.2% $Al_2O_3$) was mixed with 38.3 grams of the high density Dow 60 D magnesium hydroxide slurry prepared in accordance with Series Two, Example 4 of U.S. Patent No. 3,080,215. The resulting suspension was mixed for half an hour. The slurry was then dried at 45° C. for 8 hours and the dried lumps were pulverized in a Mikro Sample Mill using a 0.20 inch mesh herringbone screen to yield 36 grams of a codried aluminum hydroxide— magnesium hydroxide antacid gel in the form of a white free-flowing powder. The product analyzed as follows:

MgO, percent _____ 27.6
$Al_2O_3$, percent _____ 27.7
MgO/$Al_2O_3$ ratio (weight basis) _____ 1.00/1.00

EXAMPLE 3

100 grams of a freshly precipitated aluminum hydroxide gel (10.2% $Al_2O_3$), and 65.1 grams of a high density magnesium hydroxide slurry, prepared in accordance with Series Two, Example 5 of U.S. Patent No. 3,080,215, were mixed for one half hour with 10 grams of sorbitol solution (70%) added as an excipient. The slurry was then dried at 45° C. for 10 hours to yield 46.4 grams of a codried aluminum hydroxide—magnesium hydroxide antacid gel in the form of a white free-flowing powder after being pulverized through 0.20 inch mesh herringbone screen on a Mikro Sample Mill. The product analyzed as follows:

MgO, percent _____ 37.2
$Al_2O_3$, percent _____ 22.0
MgO/$Al_2O_3$ ratio (weight basis) _____ 1.69/1.00
Sorbitol, percent _____ 14.8

EXAMPLE 4

100 grams of fresh aluminum hydroxide gel (10.2% $Al_2O_3$) was added to 65.1 grams of high density magnesium hydroxide slurry, prepared in accordance with Series One, Example 1 of U.S. Patent No. 3,080,215, and 7.3 grams of glycine (technical). The mixture was agitated as before then dried at 45° C. for ten hours. The yield after pulverization was 46.7 grams of a codried aluminum hydroxide—magnesium hydroxide antacid gel in the form of a white powder. The product analyzed:

MgO, percent _____ 37.0
$Al_2O_3$, percent _____ 21.8
MgO/$Al_2O_3$ ratio (weight basis) _____ 1.69/1.00
Glycine, percent _____ 15.6

Each of the products of Examples 1 through 4 was tested by the modified Holbert, Noble and Grote test procedure using a one gram sample. The following pH data were obtained:

*Table 1.—pH of artificial gastric juice*

[One gram dose of antacid]

| Example No. | 1 | 2 | 3 | 4 |
|---|---|---|---|---|
| Time (minutes): | | | | |
| 0 | 1.6 | 1.7 | 1.7 | 1.8 |
| 1/4 | 1.85 | 1.9 | 2.0 | 2.6 |
| 1/2 | 1.90 | 2.0 | 2.5 | 3.2 |
| 1 | 2.10 | 2.2 | 3.8 | 4.0 |
| 2 | 2.70 | 3.0 | 4.0 | 4.15 |
| 3 | 3.80 | 3.85 | 4.0 | 4.20 |
| 4 | 4.0 | 3.90 | 4.05 | 4.20 |
| 5 | 4.05 | 4.00 | 4.05 | 4.20 |
| 6 | 4.10 | 4.00 | 4.10 | 4.20 |
| 7 | 4.15 | 4.00 | 4.10 | 4.30 |
| 8 | 4.20 | 4.05 | 4.15 | 4.30 |
| 9 | 4.25 | 4.1 | 4.20 | 4.35 |
| 10 | 4.30 | 4.1 | 4.20 | 4.35 |
| 20 | 4.20 | 4.15 | 4.30 | 4.50 |
| 30 | 4.20 | 4.1 | 4.30 | 4.40 |
| 40 | 4.15 | 4.05 | 4.30 | 4.35 |
| 50 | 4.10 | 4.05 | 4.30 | 4.35 |
| 60 | 4.05 | 4.05 | 4.20 | 4.30 |
| 70 | 4.00 | 4.0 | 4.15 | 4.30 |
| 80 | 4.00 | 4.0 | 4.10 | 4.20 |
| 90 | 3.90 | 4.0 | 4.05 | 4.20 |
| 100 | 3.80 | 3.95 | 4.0 | 4.15 |
| 110 | 3.75 | 3.85 | 3.95 | 4.05 |
| 120 | 3.60 | 3.8 | 3.80 | 3.85 |
| 130 | 3.30 | 3.6 | 3.60 | 3.65 |
| 140 | 3.0 | 3.35 | 3.30 | 3.45 |
| 150 | 2.7 | 3.0 | 3.0 | 3.20 |
| 160 | 2.55 | 2.7 | 2.7 | 2.95 |
| 170 | 2.35 | 2.5 | 2.7 | 2.75 |

The pH versus time curves corresponding to the above data appear in FIGURE 1.

The data shows that Compositions 1 through 4, inclusive, produce an immediate sharp increase in pH to within the desired range of 3 to 5 and do not exceed a maximum of 4.5. They demonstrate the ability to maintain a pH within this range for a period of approximately two hours or more.

EXAMPLE 5

100 grams of fresh aluminum hydroxide gel (10.6% $Al_2O_3$) was added to 65.1 grams of high density magnesium hydroxide slurry prepared in accordance with Example 2, Series One of U.S. Patent No. 3,080,215, and the resultant suspension was agitated for one half hour. The suspension was then dried and powdered as in Examples 1 through 4 to produce 48.0 grams of a codried aluminum hydroxide—magnesium hydroxide antacid gel in the form of a white powder analyzing as follows:

| | |
|---|---|
| MgO, percent | 36.0 |
| $Al_2O_3$, percent | 21.3 |
| MgO/$Al_2O_3$ ratio (weight basis) | 1.69/1.00 |

EXAMPLE 6

A slurry in accordance with Example 5 was prepared. The resultant suspension was maintained at a temperature of 60° C. for 1 hour and then dewatered by filtration. The unwashed filter cake was dried at 45° C. for 9 hours and the dried filter cake pulverized to make a codried antacid gel of aluminum and magnesium hydroxides in the form of a white free-flowing powder having the following composition:

| | |
|---|---|
| MgO, percent | 36.5 |
| $Al_2O_3$, percent | 21.6 |
| MgO/$Al_2O_3$ ratio (weight basis) | 1.69/1.00 |

One gram samples of the products of Examples 5 and 6 were tested for antacid characteristics as in Examples 1 to 4, with the following data obtained:

*Table II.—pH of artificial gastric juice*

[One gram dose of antacid]

| Example No | 5 | 6 |
|---|---|---|
| Time (minutes): | | |
| 0 | 1.8 | 1.6 |
| ¼ | 1.95 | 1.8 |
| ½ | 2.1 | 2.0 |
| 1 | 2.5 | 2.15 |
| 2 | 3.8 | 2.9 |
| 3 | 4.0 | 3.9 |
| 4 | 4.05 | 4.0 |
| 5 | 4.1 | 4.0 |
| 6 | 4.15 | 4.0 |
| 7 | 4.2 | 4.05 |
| 8 | 4.25 | 4.10 |
| 9 | 4.3 | 4.15 |
| 10 | 4.3 | 4.20 |
| 20 | 4.25 | 4.20 |
| 30 | 4.2 | 4.10 |
| 40 | 4.1 | 4.0 |
| 50 | 4.1 | 4.0 |
| 60 | 4.1 | 4.0 |
| 70 | 4.05 | 3.95 |
| 80 | 4.0 | 3.9 |
| 90 | 3.95 | 3.9 |
| 100 | 3.9 | 3.85 |
| 110 | 3.85 | 3.8 |
| 120 | 3.75 | 3.7 |
| 130 | 3.60 | 3.6 |
| 140 | 3.45 | 3.4 |
| 150 | 3.1 | 3.1 |
| 160 | 2.8 | 3.0 |
| 170 | 2.5 | 2.8 |

Figure 2:
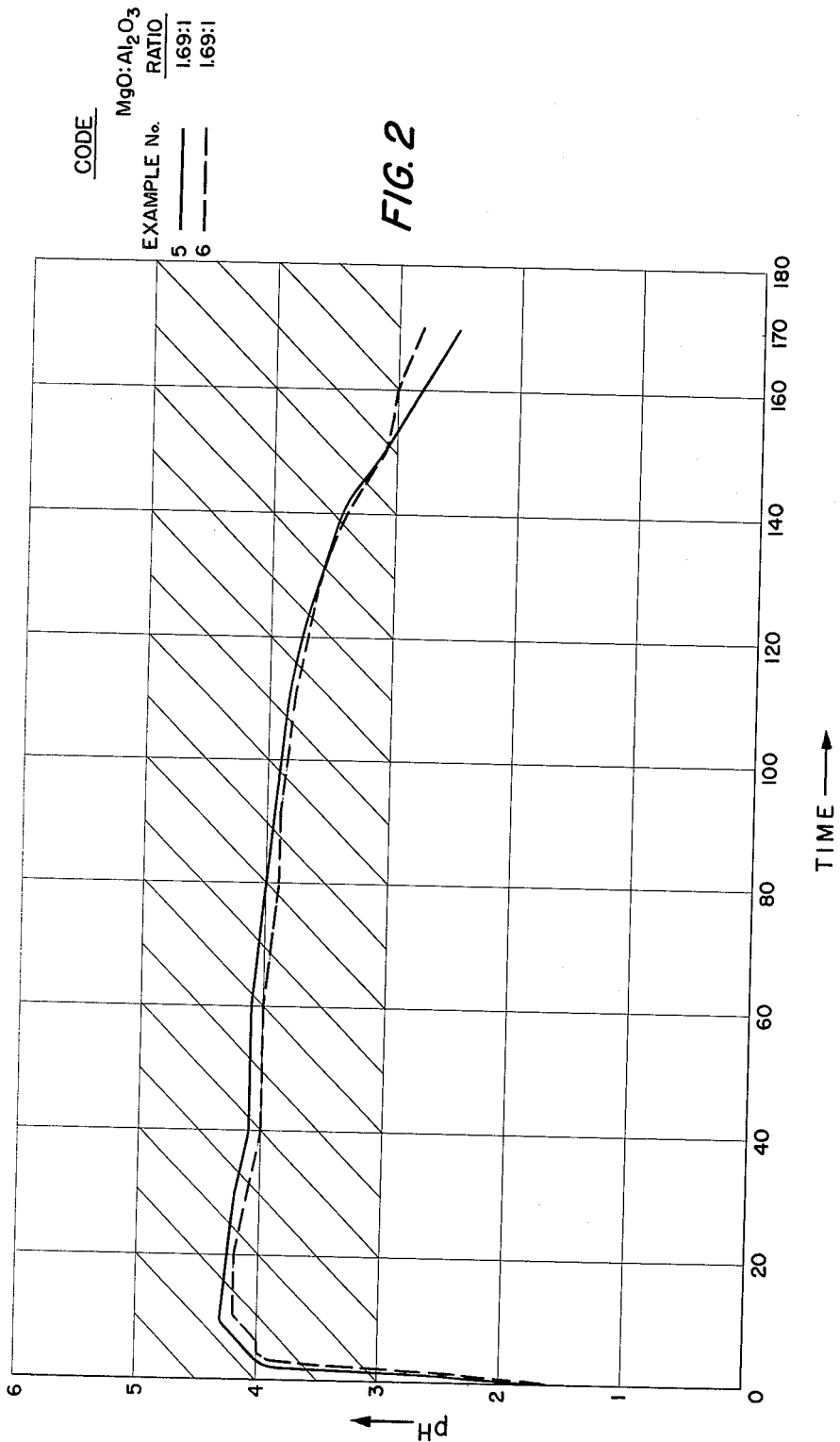

The pH curves corresponding to the above data appear in FIGURE 2.

The data show that neither the temperatures at which the slurry is prepared nor the dewatering process employed have a significant effect on the antacid characteristics of the product obtained.

The following examples were carried out in order to demonstrate the importance of the nature of the magnesium hydroxide employed.

EXAMPLE 7

100 grams of fresh F–1000 aluminum hydroxide gel and 88 grams of the 60 D magnesium hydroxide slurry from Example 3, Series Two, of U.S. Patent No. 3,080,-215 were mixed and dried at 45° C. as in Example 1. The drying time was 12 hours and, after pulverization to form a white free-flowing powder, the yield was 62.8 grams. The analysis of the codried antacid gel product comprising a mixture of aluminum and magnesium hydroxides was:

| | |
|---|---|
| MgO, percent | 40.6 |
| $Al_2O_3$, percent | 15.9 |
| MgO/$Al_2O_3$ ratio | 2.5/1.0 |

For comparison, 100 grams of the same aluminum hydroxide gel was added to 122.5 grams of a low density magnesium hydroxide, "Hydro-Magma" paste No. 314 (20.8% MgO) manufactured by Merck and Co. The resultant slurry was treated in a manner identical to that of Example 7, to give a yield of 76.3 grams of a codried antacid gel of aluminum hydroxide and magnesium hydroxide having the following analysis:

| | |
|---|---|
| MgO, percent | 33.4 |
| $Al_2O_3$, percent | 13.4 |
| MgO/$Al_2O_3$ ratio | 2.5/1.0 |

Figure 3:
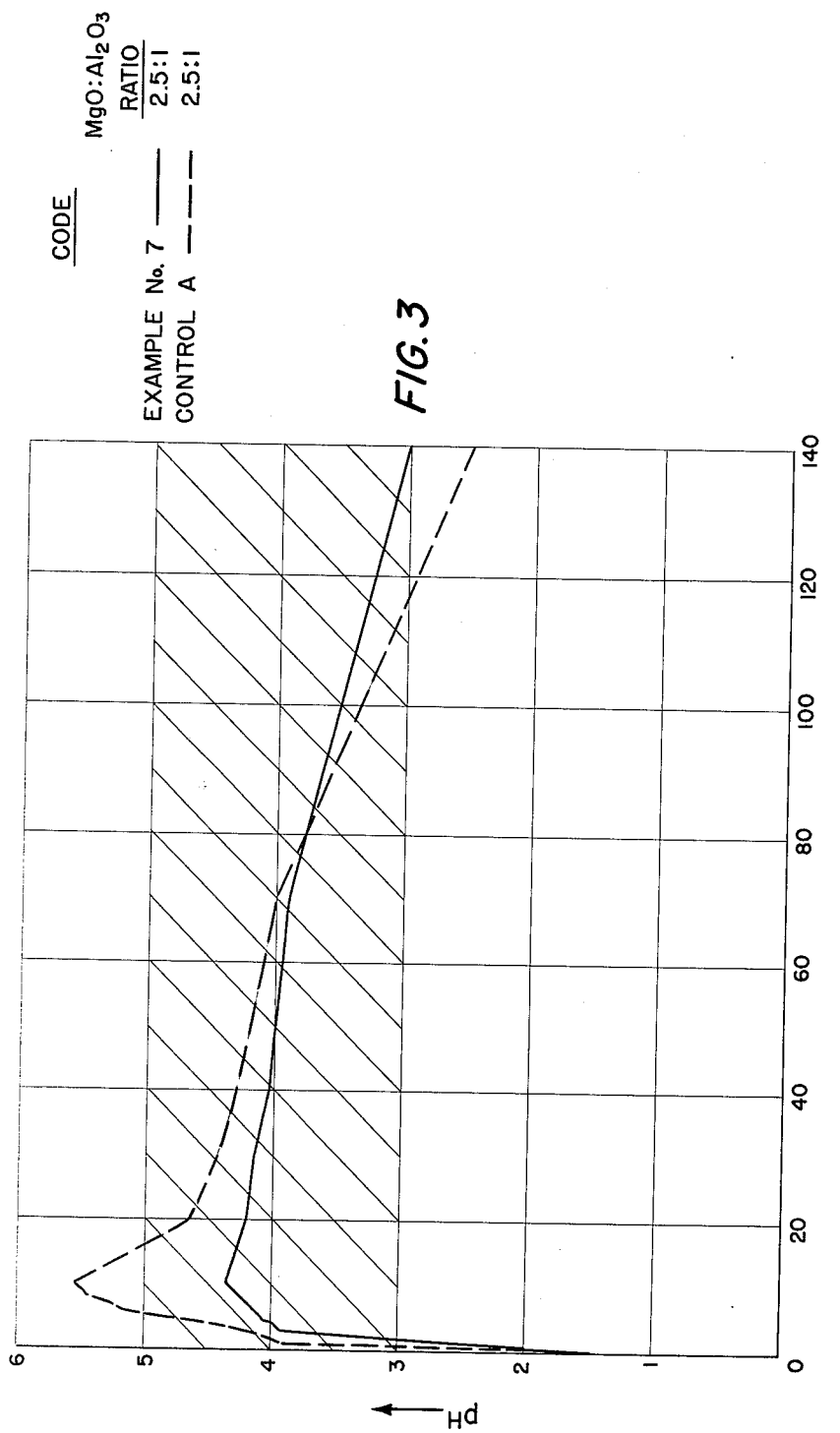

The pH data obtained from one gram samples of the products of Examples 7 and its control by the Holbert, Noble and Grote procedure are given in Table III and graphed in FIGURE 3.

*TABLE III.—pH of artificial gastric juice*

[one Gram Dose of Antacid]

| MgO/$Al_2O_3$ ratio | 2.5:1 | |
|---|---|---|
| | Example No. 7 | Control A |
| Type of magnesium hydroxide used | High density | Low density |
| Graph of data | Figure 3 | |
| Time (minutes): | | |
| 0 | 1.5 | 1.5 |
| ¼ | <2.0 | <2.0 |
| ½ | <2.0 | 2.4 |
| 1 | 2.25 | 3.9 |
| 2 | 3.30 | 4.1 |
| 3 | 3.95 | 4.3 |
| 4 | 4.0 | 4.6 |
| 5 | 4.1 | 4.95 |
| 6 | 4.15 | 5.2 |
| 7 | 4.20 | 5.3 |
| 8 | 4.25 | 5.45 |
| 9 | 4.30 | 5.5 |
| 10 | 4.35 | 5.55 |
| 20 | 4.20 | 4.65 |
| 30 | 4.15 | 4.45 |
| 40 | 4.05 | 4.3 |
| 50 | 4.0 | 4.2 |
| 60 | 3.95 | 4.1 |
| 70 | 3.90 | 4.0 |
| 140 | 3.00 | <2.5 |

EXAMPLES 8 AND 9

Similar comparative runs were made using the same materials as in Example 7 and its control but at different MgO:$Al_2O_3$ ratios. The mixing and drying procedures were as in Example 1. The antacid characteristics as measured by the modified Holbert, Noble and Grote method are given in Table IV and graphed in FIGURE 4.

Table IV.—pH of artificial gastric juice

[One gram dose of antacid]

Figure 4:
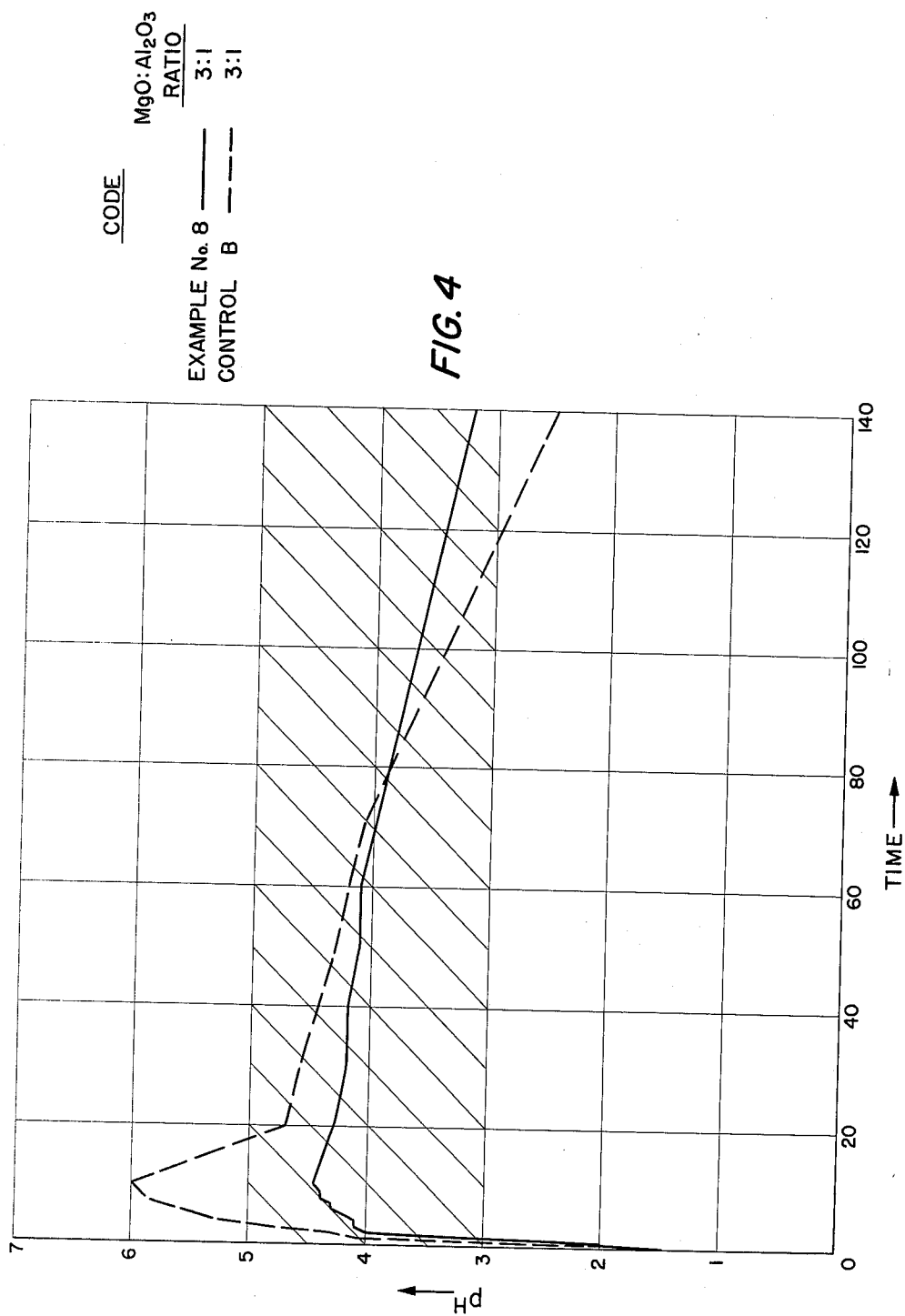
Figure 5:
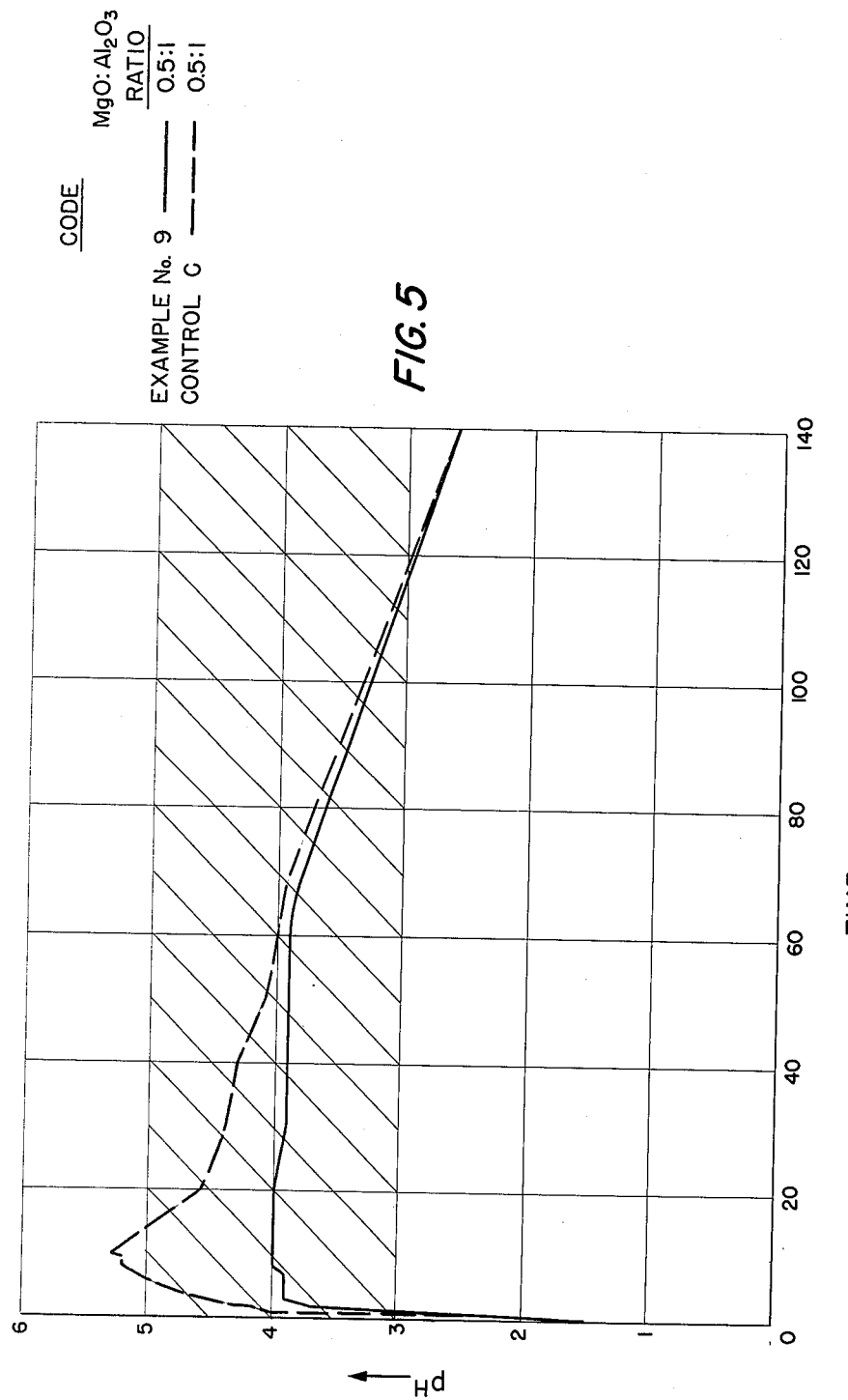

| MgO/Al$_2$O$_3$ ratio | 3:1 | | 0.5:1 | |
|---|---|---|---|---|
| | Example No. 8 | Control B | Example No. 9 | Control C |
| Type of magnesium hydroxide used | High density | Low density | High density | Low density |
| Graph of data | Figure 4 | | Figure 5 | |
| Time (minute): | | | | |
| 0 | 1.5 | 1.5 | 1.5 | 1.5 |
| ¼ | <2.0 | <2.0 | 2.0 | 2.0 |
| ½ | <2.0 | 2.4 | 2.1 | 2.4 |
| 1 | 2.3 | 4.05 | 2.4 | 4.0 |
| 2 | 4.0 | 4.35 | 3.7 | 4.3 |
| 3 | 4.1 | 4.90 | 3.9 | 4.5 |
| 4 | 4.1 | 5.30 | 3.9 | 4.7 |
| 5 | 4.2 | 5.50 | 3.9 | 4.9 |
| 6 | 4.3 | 5.65 | 3.9 | 5.0 |
| 7 | 4.3 | 5.80 | 3.9 | 5.1 |
| 8 | 4.4 | 5.90 | 4.0 | 5.2 |
| 9 | 4.4 | 5.95 | 4.0 | 5.2 |
| 10 | 4.5 | 6.0 | 4.0 | 5.3 |
| 20 | 4.3 | 4.7 | 4.0 | 4.6 |
| 30 | 4.2 | 4.6 | 3.9 | 4.4 |
| 40 | 4.2 | 4.45 | 3.9 | 4.3 |
| 50 | 4.1 | 4.30 | 3.9 | 4.1 |
| 60 | 4.1 | 4.20 | 3.9 | 4.0 |
| 70 | 4.0 | 4.10 | 3.8 | 3.9 |
| 140 | 3.2 | <2.50 | 2.6 | 2.6 |

The results obtained from those tests using the high density magnesium hydroxide slurry (Examples 7 to 9) are comparable to those shown in the preceding examples, i.e., the pH increases very rapidly but the pH peak remains at 4.5 or below, and the pH remains above 3 for a period in excess of two hours. However, the materials made using the low density magnesium hydroxide (Controls A, B, and C), while also fast acting, show a substantially higher initial pH rise, reaching peak pH values at high as 6. Also, they do not maintain a pH in the preferred range (3–4.5) for as long as the material made with the high density slurry except at relatively low MgO:Al$_2$O$_3$ ratios. These runs demonstrate the necessity of using a magnesium hydroxide of the appropriate characteristics in order to produce antacids of high MgO content having suitable pH vs. time relationships.

EXAMPLE 10

258 grams of 24.2° Bé. AlCl$_3$ solution was added, in one hour, to a slurry consisting of 66.4 grams Na$_2$CO$_3$, 58% Na$_2$O, 86 grams Mg(OH)$_2$, 60D slurry, 31% MgO, prepared in accordance with Example 4, Series Two, of U.S. Patent No. 3,080,215, and 1630 mls. deionized water. The end pH was 7.5. After aging this precipitate for one hour, the pH had risen to 7.9, at which time it was filtered through No. 1 Whatman paper on two Büchner funnels and washed with deionized water. A 252.5 gram cake of a white compressed antacid gel was isolated. An antacid suspension was made therefrom, which assayed as follows:

Al$_2$O$_3$, percent _____ 2.26
MgO, percent _____ 2.46
MgO/Al$_2$O$_3$ w./w. ratio _____ 1.08/1.00
pH _____ 8.30
Na, percent _____ 0.08
Cl _____ nil
CO$_2$, percent _____ 1.0
Fe, p.p.m. _____ 35
Heavy metals, p.p.m. _____ <5
Arsenic, p.p.m. _____ <1
A.C.C. at pH 3.5 _____ [1] 25.65
A.C.C. at pH 3.9 cc. _____ 24.95
Viscosity, cps. _____ 143

[1] Cc. N/10 HCl/gm. suspension.

Yields:

Al$_2$O$_3$, percent _____ 100
MgO, percent _____ 98.5
A.C.C. at pH 3.9 [1] percent _____ 97

[1] A.C.C.=acid consuming capacity per gram of 0.1 N HCl (vol. acid consumed to 3.5 to 3.9), pH end-point.

EXAMPLE 11

258 grams of 24.2° Bé. AlCl$_3$ solution was added, in one hour, to a slurry consisting of 106 grams NaHCO$_3$, U.S.P. powder, 86 grams Mg(OH)$_2$, 60D slurry, 31%, MgO, prepared in accordance with Example 3, Series Two, of U.S. Patent No. 3,080,215, and 1590 mls. deionized water. The end pH was 7.6. After aging for one hour, the pH rose to 7.8, at which time the precipitate was filtered through No. 1 Whatman paper on two Büchner funnels and washed with deionized water. A 282.8 gram cake of a white compressed gel antacid was isolated. An antacid suspension was made therefrom, which assayed as follows:

Al$_2$O$_3$, percent _____ 2.31
MgO, percent _____ 1.23
MgO/Al$_2$O$_3$ w./w. ratio _____ 0.53/1.00
pH _____ 8.10
Na, percent _____ 0.06
Cl _____ nil
CO$_2$, percent _____ 1.4
Fe, p.p.m. _____ 36
Heavy metals, p.p.m. _____ <5
Arsenic, p.p.m. _____ <1
A.C.C. at pH 3.5 _____ [2] 19.0
A.C.C. at pH 3.9 _____ [3] 18.6
Viscosity, cps. _____ 138

Yields:

Al$_2$O$_3$, percent _____ 100
MgO, percent _____ 41.8
A.C.C. at pH 3.9 [1], percent _____ 94.4

[1] A.C.C.=acid consuming capacity per gram of 0.1 N HCl (vol. acid consumed to 3.5 to 3.9), pH end-point.
[2] Cc. N/10 HCl/gm. suspension.
[3] Cc. N/10 HCl/gm. suspension.

EXAMPLE 12

258 grams 24.2° Bé. $AlCl_3$ solution was added, in one hour, to a solution of 66.4 grams $Na_2CO_3$, 58% $Na_2O$, in 1000 mls. deionized water. The end pH was 5.2. After aging for one hour, the pH was adjusted from 5.85 to 5.2 with $AlCl_3$ solution. Next, 67 grams of $Mg(OH)_2$, 60D gel cake, 47.9% MgO, prepared in accordance with Example 1, Series One of U.S. Patent No. 3,080,215, and filtered, was slurried into the precipitate and the whole slurry aged four hours with agitation. The slurry pH was 7.8 when it was filtered through No. 1 Whatman paper on two 24.5 cm. Büchner funnels and washed with deionized water. A 269.7 gram cake of a white compressed antacid gel was isolated and an antacid suspension was made therefrom, which assayed as follows:

| | |
|---|---|
| $Al_2O_3$, percent | 2.33 |
| MgO, percent | 3.5 |
| $MgO/Al_2O_3$ w./w. ratio | 1.51/1.0 |
| pH | 8.25 |
| Na, percent | 0.09 |
| Cl | Nil |
| $CO_2$ | 0.78 |
| Fe, p.p.m. | 38 |
| Heavy metals, p.p.m. | 5 |
| Arsenic, p.p.m. | 1 |
| A.C.C. at pH 3.5 [1], cc./gm. | 30.5 |
| A.C.C. at pH 3.9 [1], cc./gm. | 30.1 |
| Viscosity, cps. | 108 |

Yields:
| | |
|---|---|
| $Al_2O_3$, percent | 100 |
| MgO, percent | 98.5 |
| A.C.C. at pH 3.9 [1], percent | 97 |

[1] A.C.C.=acid consuming capacity per gram of 0.1 N HCl (vol. acid consumed to 3.5 to 3.9), pH end-point.

EXAMPLE 13

582 grams of $Mg(OH)_2$, 60D slurry, 31% MgO, prepared in accordance with Example 2, Series One, of U.S. Patent No. 3,080,215, was filtered through No. 1 Whatman paper on an 18.5 cm. Büchner funnel and washed with deionized water. A gel cake of 453.7 grams was separated from the supernatant liquid at a concentration of 47.9% MgO. 100 grams of type F–1000 compressed aluminum hydroxide gel (10.6% $Al_2O_3$) was diluted with 22 mls. of deionized water and 43.4 grams of the above mentioned $Mg(OH)_2$, 60D gel cake, 47.9% MgO, was intermixed with the F–1000 gel by one hour of stirring with a Lightnin' mixer.

This antacid gel was then dried at 45° C. for 5½ hours and yielded 55.9 grams of a soft white antacid powder when ground through a 0.20 inch mesh herringbone screen on a Mikro Sample Mill.

| | |
|---|---|
| $Al_2O_3$, percent | 19.4 |
| MgO, percent | 37.2 |
| $MgO/Al_2O_3$ w./w. ratio | 1.92/1.0 |
| pH (4% powder suspension) | 9.25 |
| Fe, p.p.m. | 446 |
| Reheis reaction velocity, seconds | 33 |
| Mutch reaction velocity, seconds | 42.1 |
| A.C.C. at pH 3.5, cc./gm. | 299 |
| A.C.C. at pH 3.9, cc./gm. | 294 |

Yields:
| | |
|---|---|
| $Al_2O_3$, percent | 100 |
| MgO, percent | 100 |
| A.C.C. at pH 3.9 [1] | 98.7 |

[1] A.C.C.=acid consuming capacity per gram of 0.1 N HCl (vol. acid consumed to 3.5 to 3.9), pH end-point.

The antacid activity was evaluated by the Holbert, Noble and Grote test, with the following results:

Table V

| Time (minutes): | pH | Time (minutes): | pH |
|---|---|---|---|
| 0 | 1.85 | 30 | 4.35 |
| 0.25 | 2.05 | 40 | 4.3 |
| 0.5 | 2.1 | 50 | 4.25 |
| 1 | 2.2 | 60 | 4.15 |
| 2 | 2.95 | 70 | 4.1 |
| 3 | 3.9 | 80 | 4.0 |
| 4 | 4.2 | 90 | 3.8 |
| 5 | 4.3 | 100 | 3.55 |
| 6 | 4.4 | 110 | 3.3 |
| 7 | 4.45 | 120 | 3.0 |
| 8 | 4.5 | 130 | 2.75 |
| 9 | 4.6 | 140 | 2.55 |
| 10 | 4.65 | 143 | 2.50 |
| 20 | 4.4 | | |

Total overflow 1080 ml. in 135 min.
Max. pH=4.65
Time to pH 3.0=2 min. 5 sec.
Avg. overflow rate 8.0 ml./min.
Time above pH 3.0=118 min.
Time above pH 2.5=141 min.

EXAMPLE 14

24 grams of $Mg(OH)_2$, 60D slurry (64% MgO), which had been prepared in accordance with Example 5, Series Two of U.S. Patent No. 3,080,215 and then spray dried from its original slurry form, was added to a slurry of 100 grams of aluminum hydroxide gel, type F–1000 (10.2% $Al_2O_3$) and 40 mls. of deionized water. This mixture was agitated for one hour with a Lightnin' mixer. The slurry was then dried at 45° C. for 6¼ hours to yield 45.5 grams of a white, free-flowing powder when pulverized through a 0.20 inch mesh herringbone screen on a Mikro Sample Mill.

| | |
|---|---|
| MgO, percent | 34 |
| $Al_2O_3$, percent | 22.4 |
| $MgO/Al_2O_3$ w./w. ratio | 1.51/1.00 |

An antacid evaluation was made following the Holbert, Noble and Grote modified procedure using a 1.0 gram dosage of the above powder and the following data taken:

Table VI

| Time (minutes): | pH | Time (minutes): | pH |
|---|---|---|---|
| 0 | 1.7 | 20 | 4.3 |
| 0.25 | 1.85 | 30 | 4.3 |
| 0.5 | 1.95 | 40 | 4.2 |
| 1 | 2.2 | 50 | 4.2 |
| 2 | 3.0 | 60 | 4.1 |
| 3 | 3.9 | 70 | 4.0 |
| 4 | 4.1 | 80 | 3.95 |
| 5 | 4.15 | 90 | 3.85 |
| 6 | 4.2 | 100 | 3.6 |
| 7 | 4.25 | 110 | 3.35 |
| 8 | 4.3 | 120 | 3.05 |
| 9 | 4.35 | 121 | 3.0 |
| 10 | 4.4 | | |

For comparison, 20 grams of aluminum hydroxide dried gel, type F–1000, 50.8% $Al_2O_3$, was intimately mixed with 27.1 grams of $Mg(OH)_2$, 60D, 64% MgO, which had been spray dried from its original slurry form, prepared in accordance with Example 5, Series Two of U.S. Patent No. 3,080,215. The dry blend was evaluated for antacid activity following the Holbert, Noble and Grote modified procedure, using a 1.0 gram dose. The following data were taken:

*Table VII*

| Time (minutes): | pH | Time (minutes): | pH |
|---|---|---|---|
| 0 | 1.7 | 20 | 4.8 |
| 0.25 | 2.0 | 30 | 4.9 |
| 0.5 | 3.15 | 40 | 5.0 |
| 1 | 4.7 | 50 | 5.0 |
| 2 | 5.3 | 60 | 5.0 |
| 3 | 5.6 | 70 | 5.0 |
| 4 | 5.85 | 80 | 4.95 |
| 5 | 6.1 | 90 | 4.9 |
| 6 | 6.1 | 100 | 4.7 |
| 7 | 6.25 | 110 | 4.45 |
| 8 | 6.3 | 120 | 3.9 |
| 9 | 6.45 | 130 | 3.0 |
| 10 | 6.5 | | |

The data of Table VII show that the dry blend is not in any way the same as the antacid of the same $MgO:Al_2O_3$ ratio obtained when the two gels, $Mg(OH)_2$ and $Al_2(OH)_6$, are mixed wet and codried in accordance with the invention (Table VI). Whereas the antacid of the invention gives a maximum pH of 4.4 and maintains pH within the range of 3 to 4.5 for two hours, the dry blend gives a maximum pH of 6.5 and a pH above 5 for fifteen minutes and above 4.5 for thirty minutes, for a maximum above 3 but below 4.5 of only twenty minutes.

Also for comparison, a sample of hydro magma, 1021/314, 30% $Mg(OH)_2$, was air dried at 45° C. for 12 hours. A soft, off-white powder was obtained after pulverizing through a 0.01 inch mesh screen on a Mikro Sample Mill.

24.2 grams of the above $Mg(OH)_2$, 92% $Mg(OH)_2$, was added to a slurry of 100 grams of aluminum hydroxide gel, type F–1000 (10.2% $Al_2O_3$) and 40 mils of deionized water. This mixture was then agitated for one hour with a Lightnin' mixer. The slurry was then dried at 45° C. for 6½ hours to yield 45.7 grams of a white, free-flowing powder when pulverized through a 0.20 inch mesh herringbone screen on a Mikro Sample Mill.

| | |
|---|---|
| MgO, percent | 32.4 |
| $Al_2O_3$, percent | 21.5 |
| $MgO/Al_2O_3$ w./w. ratio | 1.51/1.00 |

An antacid evaluation was made following the Holbert, Noble and Grote modified procedure using a 1.0 gram dosage of the above powder.

*Table VIII*

| Time (minutes): | pH | Time (minutes): | pH |
|---|---|---|---|
| 0 | 1.6 | 40 | 4.4 |
| 0.25 | 2.2 | 50 | 4.3 |
| 0.5 | 2.5 | 60 | 4.2 |
| 1 | 4.0 | 70 | 4.05 |
| 2 | 4.4 | 80 | 3.95 |
| 3 | 4.6 | 90 | 3.8 |
| 4 | 4.85 | 100 | 3.7 |
| 5 | 5.1 | 110 | 3.5 |
| 6 | 5.25 | 120 | 3.3 |
| 7 | 5.4 | 130 | 3.1 |
| 8 | 5.5 | 133 | 3.0 |
| 9 | 5.55 | 140 | 2.8 |
| 10 | 5.6 | 150 | 2.55 |
| 20 | 4.65 | 152 | 2.5 |
| 30 | 4.55 | | |

This antacid likewise did not meet the pH range requirement, since the pH rose above 5 and remained above 5 for ten minutes at the start of the test, and remained above 4.5 for thirty minutes.

As previously indicated, the compositions in accordance with the invention are useful in the treatment of internal conditions where excess acidity is to be encountered, such as gastric acidity in the stomach in, for example, the treatment of gastric and peptic ulcers. For this purpose the dry compositions are readily administered in the form of slurries or as dry powders or tablets, with an excipient if desired, which are suitably taken orally or added to a liquid carrier such as water.

It is usually most convenient to prepare the compositions in tablet form and, since the compositions are relatively inert and store well, tablets are easily prepared by conventional procedures. The composition can be tabletted as such or with an excipient mixture of conventional type. The following is a typical tablet formulation:

| | Grams |
|---|---|
| Antacid composition | 32,000 |
| Lactose | 62,620 |
| Starch | 6,800 |
| Monosodium phosphate | 1,130 |
| Stearic acid | 1,130 |

The quantity indicated is sufficient to prepare approximately 48,000 tablets, containing 10 grains each of the antacid composition.

Those skilled in the art will perceive other methods for the administration of the compositions and it will be apparent that these are in no way critical but can be selected to meet any particular requirements.

I claim:
1. A process for preparing an antacid composition capable as determined by the Holbert, Noble and Grote test method of maintaining the pH of artificial gastric juice within the range from 3 to about 5 for at least one hour which comprises preparing an aqueous slurry of a freshly precipitated hydrous gelatinous aluminum hydroxide and mixing therewith a high density magnesium hydroxide in a molecular weight ratio calculated as $MgO:Al_2O_3$ within the range of from about 1.25:1 to about 7.5:1, said magnesium hydroxide being formed by intermixing with magnesium-chloride-containing brine, at a temperature of about 40° to about 80° C. for a period of at least 2 hours, sufficient slaked dolime slurry to provide a slight excess of calcium hydroxide relative to magnesium chloride, and recovering the magnesium hydroxide thus produced.

2. A process in accordance with claim 1 in which the high density magnesium hydroxide is a dry magnesium hydroxide gel.

3. A process in accordance with claim 1 in which the high density magnesium hydroxide is a moist magnesium hydroxide gel.

4. A process in accordance with claim 1 in which the high density magnesium hydroxide is a slurry of magnesium hydroxide in water.

5. A process in accordance with claim 1 which includes drying the resulting slurry to form a codried antacid composition.

6. An antacid composition prepared according to the process of claim 1 capable as determined by the Holbert, Noble and Grote test method of maintaining the pH of artificial gastric juice within the range from about 3 to about 5 for at least one hour comprising a mixture of moist aluminum hydroxide and high density magnesium hydroxide in a molecular weight ratio calculated as $MgO:Al_2O_3$ within the range from about 1.25:1 to about 7.5:1, said magnesium hydroxide being formed by intermixing with magnesium-chloride-containing brine, at a temperature of about 40° to about 80° C. for a period of at least about 2 hours, sufficient slaked dolime slurry to provide a slight excess of calcium hydroxide relative to magnesium chloride, and recovering the magnesium hydroxide thus produced.

7. An antacid composition in accordance with claim 6 in which the high density magnesium hydroxide is in the form of a dry magnesium hydroxide gel.

8. An antacid composition in accordance with claim 6 in which the high density magnesium hydroxide is in the form of moist magnesium hydroxide gel.

9. A composition in accordance with claim 8 in which the high density magnesium hydroxide is in the form of a slurry of the gel in water.

10. An antacid composition in accordance with claim 6 which has been dried to a codried powder.

11. An antacid composition in accordance with claim 6 in the form of an equeous slurry.

12. An antacid composition in accordance with claim 6 in the form of an aqueous gel.

13. An antacid tablet comprising a composition in accordance with claim 6 and an excipient.

References Cited by the Examiner
UNITED STATES PATENTS 2,923,660   2/1960   Hallman _____ 167—55

JULIAN S. LEVITT, *Primary Examiner.*

FRANK CACCIAPAGLIA, JR., *Examiner.*

SAM ROSEN, *Assistant Examiner.*